June 16, 1942.   C. J. HOKANSON   2,286,619
WHEEL DRAG
Filed July 12, 1940   2 Sheets-Sheet 1
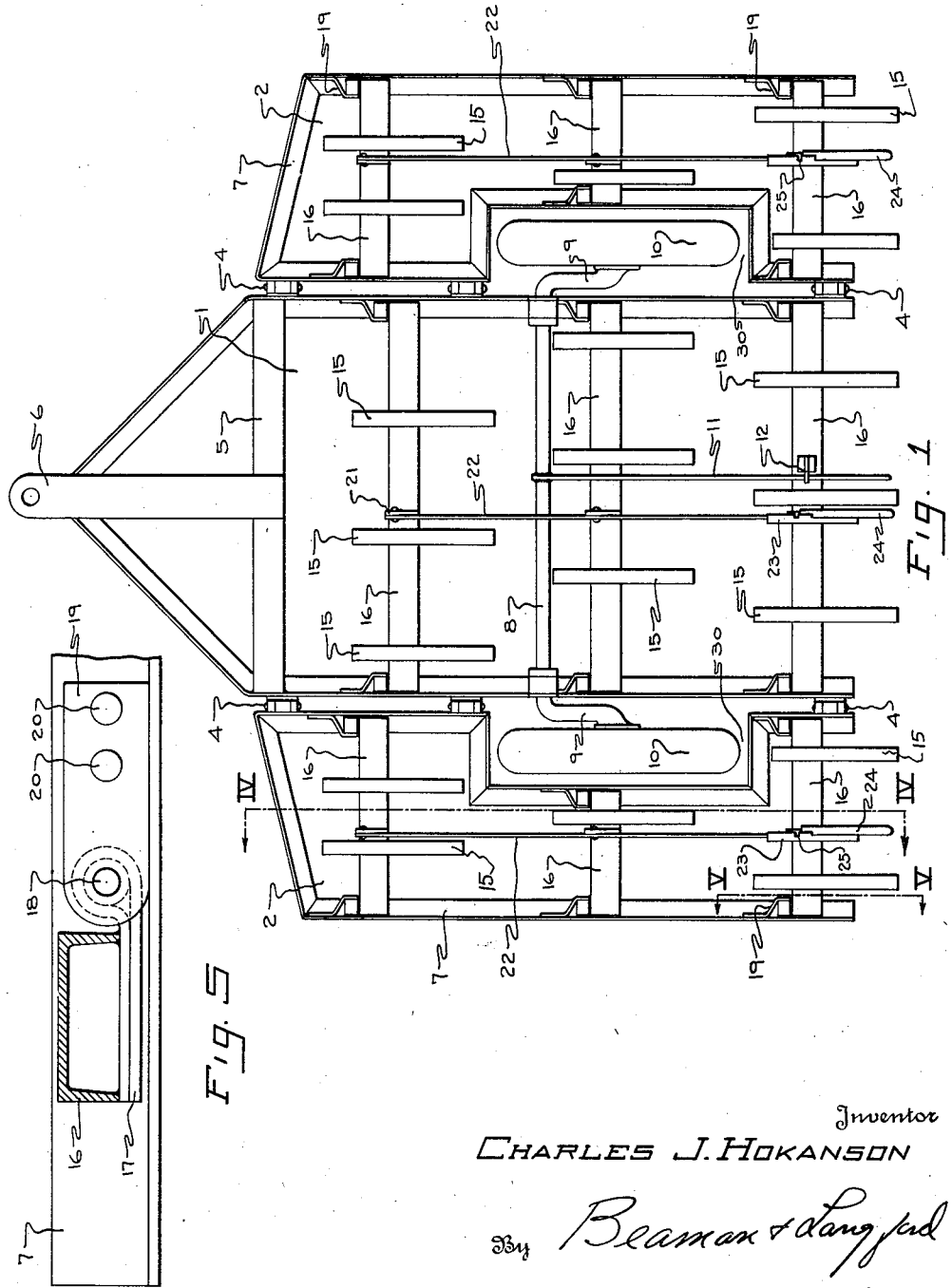
Inventor
CHARLES J. HOKANSON
By Beaman & Langford
Attorneys June 16, 1942.  C. J. HOKANSON  2,286,619
WHEEL DRAG
Filed July 12, 1940  2 Sheets-Sheet 2

Inventor
CHARLES J. HOKANSON
By Beaman & Langford
Attorneys

Patented June 16, 1942

2,286,619

UNITED STATES PATENT OFFICE 2,286,619

WHEEL DRAG

Charles J. Hokanson, Jackson, Mich., assignor of one-half to Carl W. Hokanson, Grass Lake, Mich.

Application July 12, 1940, Serial No. 345,063

6 Claims. (Cl. 55—93)

The present invention relates to agricultural implements and more particularly to a drag arranged to be transported when not in use, by wheels permanently associated therewith.

Wheel drags broadly are old. However, the present invention contemplates the provision of a wheel drag which may be elevated and lowered with respect to the wheels and which is provided with side extensions which may be folded with respect to a central portion of the drag to provide a compact unit which is easily transportable.

An object of the invention is to provide a wheel drag having foldable side extensions thereto.

Another object of the invention is to provide a wheel drag having side extensions in which there are disposed recesses for receiving the wheels.

A further object of the invention is to provide a wheel drag having side extensions pivoted with respect to a central portion, the pivotal points being substantially elevated above the general plane of the drag to permit the side extensions to clear the wheels while being folded with respect to the central portion.

A still further object of the invention is to provide a wheel drag having a lever for raising and lowering the drag with respect to the wheels, the lever being engageable with a latch on the drag when the drag is elevated with respect to the wheels.

Figure 4:
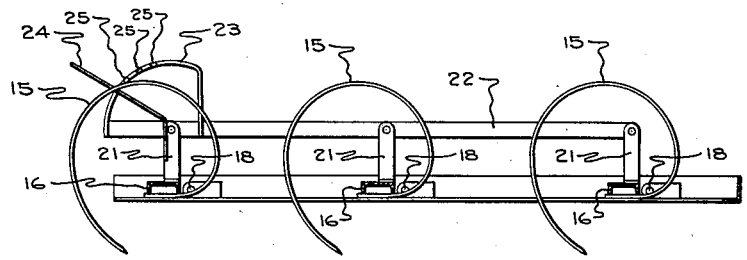
Figure 2:
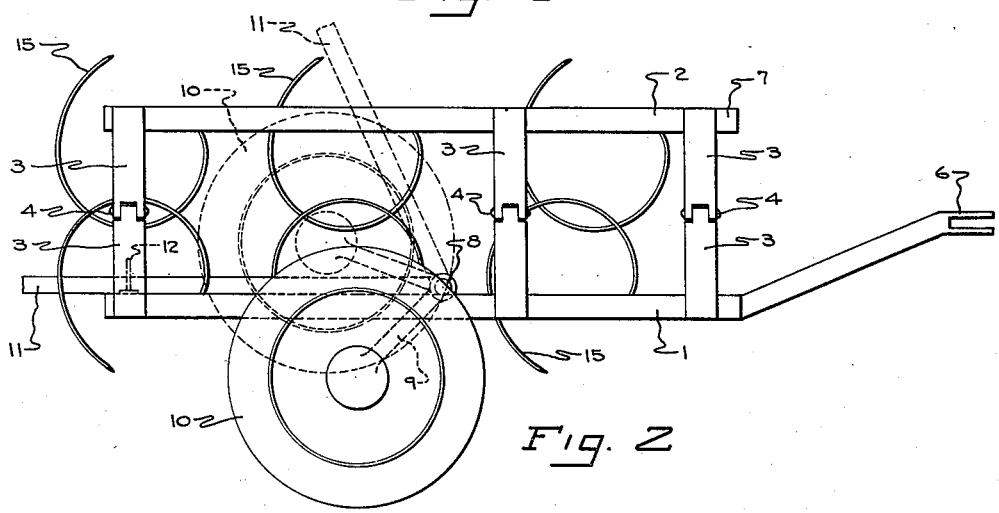
Figure 3:
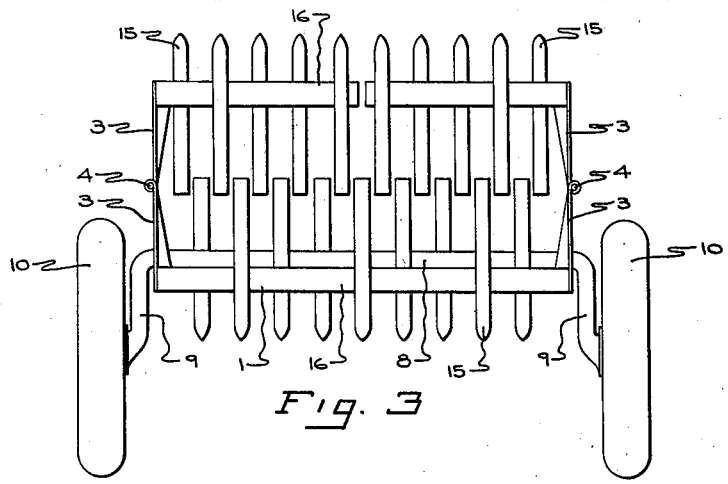

These and other objects residing in the arrangement, combination and construction of the parts will be apparent from the following specification taken with the accompanying drawings, in which Fig. 1 is a plan view of the invention in extended position, Fig. 2 is a side view of the invention in folded position, Fig. 3 is a rear view of the invention in folded position, Fig. 4 is a section on the line IV—IV of Fig. 1, and Fig. 5 is a section on the line V—V of Fig. 1.

Referring particularly to the drawings the reference character 1 indicates a central drag section provided with side extensions 2. The extensions 2 are pivoted to the central section 1 by hinges having elongated upwardly extending arms 3, the pivotal points 4 of which are elevated above the general plane of the drag when it is in extended position as shown in Fig. 1.

The central section 1 is provided with a frame 5 having connected thereto a draw bar 6. The extensions 2 have frames 7. The frames 5 and 7 preferably are constructed from angle bars or other rolled sections.

Supported for oscillation with respect to the frame 5 is a shaft 8 provided with crank arms 9 on which are rotatably supported wheels 10.

A lever 11 is rigidly secured to the shaft 8 in such a manner that by swinging it in a plane about the axis of the shaft 8 as the center, the shaft 8 is rotated. As the shaft 8 is rotated, the angular relation of the crank arm 9 with respect to the frame 5 is varied with the result that the elevations of the frames 5 and 7, with respect to the ground, are varied. The lever 11 is secured to the shaft 8 in such a manner with respect to the position of the crank arms 9 that when the lever 11 is secured beneath a latch 12 on the frame 5, the wheels 10 are projected downwardly with respect to the frame 5 thus placing the frames 5 and 7 in their elevated positions. By releasing the lever 11 from the latch 12, the wheels 10 move upwardly with respect to the frame 5 thereby lowering the drag into its operative position.

The center section 1 and the extension sections 2 are each provided with a plurality of spring drag teeth 15 supported on bars 16. The bars 16 preferably are in the form of rolled channel bars as shown particularly in Fig. 5 and have secured to each end thereof respectively, hinge members 17 pivoted about pins 18. The pins 18 are supported between parts of the frame members 5 and 7 and brackets 19 secured thereto. The brackets 19 may be secured by rivets 20 as shown particularly in Fig. 5, or may be welded if desired to the respective parts of the frames 5 and 7.

The bars 16 are pivotally supported for the purpose of adjusting the depth to which the teeth 15 project beneath the frames 5 and 7 respectively; or in other words, the depth which the teeth 15 project into the ground when in use. For providing this adjustment each of the bars 16 is provided with an upwardly extending member 21 shown particularly in Figs. 1 and 4. For each of the sections of the drag the members 21 are in alignment and have pivotally connected thereto for each section a link 22. At the rear end of each link 22 is an arcuate ratchet member 23. Connected to each rear upstanding member 21 is a lever 24 for engaging with its adjacent ratchet member 23. As viewed in Fig. 4 it will be evident that as the levers 24 are raised, they will cause the bars 16 to pivot around the pins 18 to elevate the active portions of the teeth 15. The desired adjustment of the teeth 15 is maintained by disposing the levers 24, respectively, in an appropriate one of the ratchet teeth 25 as shown in Fig. 4.

As shown particularly in Fig. 1, the frames 7 are provided with recesses 30 in which the wheels 10 are disposed. The recesses 30 and the spacing of the teeth 15 are so arranged that there is a minimum of interference with the regular spacing of the teeth 15 across the path covered by the drag. In order that the track made by the wheels 10 be obliterated, a tooth 15 is disposed immediately behind each of the wheels 10.

When the drag is in position for use, the lever 11 is free being out of engagement with the latch 12. With the lever 11 in this position, the weight of the drag causes the wheels 10 to pivot upwardly with respect to the frames 5 and 7. The teeth 15 are projected downwardly by appropriate adjustment of the levers 24. When it is desirable to arrange the drag for transportation, the teeth 15 are elevated upon manipulation of the levers 24 and the wheels 10 are projected downwardly with respect to the frames 5 and 7 by swinging the lever 11 toward the frame 5 and beneath the latch 12. The extension sections 2 are then folded into overlapping relation about the pivots 4 as shown in Figs. 2 and 3. The elevation of the pivotal axes 4 of the hinge arms 3 results in lifting the extension sections 2 over the wheels during the folding of the extension sections 2. This feature is considered to be an important part of the invention. With the drag folded and elevated from the ground, it is ready for transportation from one field of use to another or to a place of storage. For the purpose of clarity of illustration, the teeth 15 in Fig. 3 are shown interlaced and not touching each other. In actual practice it will be understood that in folding, either just before the position shown in Fig. 3 is reached or just after, the teeth of the sections 1 and 2 will engage each other to limit the pivoting of the sections 2 about the pivots 4.

While the invention has been described as associated with a spring tooth drag, it will be clear that it could be employed equally as well with a rigid tooth drag.

Having thus described my invention, what I desire to secure by Letters Patent and claim is:

1. A device of the character described comprising a frame, supporting ground wheels for said frame, means mounting said wheels on said frame, said wheels having portions extending above said frame means to vary the height above the ground said wheels support said frame, a supplementary frame disposed at each side of said first named frame, hinges having upwardly extending arms connecting said supplementary frames to said first named frame, said upwardly extending arms causing the pivotal points of said hinges to be elevated substantially above said frames, and drag teeth supported on said frames, said drag teeth having portions projecting above said frame whereby said supplementary frames may be swung about said hinges and into folded relation with respect to said first named frame, said elevated pivotal points enabling said supplementary frames to clear said wheels as they are swung into folded relation with said first named frame.

2. A device of the character described comprising a frame, supporting ground wheels for said frame, means mounting said wheels on said frame, means to vary the height above the ground said wheels support said frame, a supplementary frame disposed at each side of said first named frame, said supplementary frames having laterally offset recesses therein for receiving said wheels, hinges having upwardly extending arms connecting said supplementary frames to said first named frame, said upwardly extending arms causing the pivotal points of said hinges to be elevated substantially above said frames, and drag teeth supported on said frames, said supplementary frames having drag teeth thereon behind said wheels.

3. A device of the character described comprising a frame, a supplementary frame disposed at each side of said first named frame, said supplementary frame having laterally offset portions for receiving said wheels, hinges having upwardly extending arms connecting said supplementary frames to said first named frame, said upwardly extending arms causing the pivotal points of said hinges to be elevated substantially above said frames, and drag teeth supported on said frames, said supplementary frames having drag teeth thereon behind said wheels.

4. A device of the character described comprising a frame, supporting ground wheels for said frame, means mounting said wheels on the said frame, means to vary the height above the ground of said wheels to support said frame, a supplementary frame disposed at each side of said first named frame, said supplementary frames having laterally offset recesses therein for receiving said wheels, hinges having upwardly extending arms connecting said supplementary frames to said first named frame, said upwardly extending arms causing the pivotal points of said hinges to be elevated substantially above said frame, and drag teeth supported on said frame, whereby said supplementary frames may be swung about said hinges and into folded relation with respect to said first named frame, said elevated pivotal points enabling said supplementary frames to clear said wheels as they are swung into folded relation with said first named frame.

5. A device of the character described comprising a frame, supporting ground wheels for said frame, means mounting said wheels on said frame, a supplementary frame disposed at each side of said first named frame, said supplementary frames having border members, said supplementary frames having laterally offset recesses defined by said border members, said recesses receiving said wheels, and drag teeth supported on said frame.

6. A device of the character described comprising a frame, supporting ground wheels for said frame, means mounting said wheels on said frame, said wheels having portions extending above said frame, means to vary the height above the ground, said wheels support said frame, a supplementary frame disposed at each side of said first named frame, hinges having upwardly extending arms connecting said supplementary frames to said first named frame, said upwardly extending arms causing the pivotal points of said hinges to be elevated substantially above said frames, and spring drag teeth supported on said frame, said spring drag teeth having portions projecting substantially above said frame, whereby said supplementary frames may be swung about said hinges and into folded relation with respect to said first named frame, said elevated pivotal points enabling said supplementary frames to clear said wheels as they are swung into folded relation with said first named frame and enabling said teeth to avoid substantial interference during folding.

CHARLES J. HOKANSON.